Oct. 17, 1939.   N. TRBOJEVICH   2,176,111
UNIVERSAL JOINT
Filed March 22, 1938
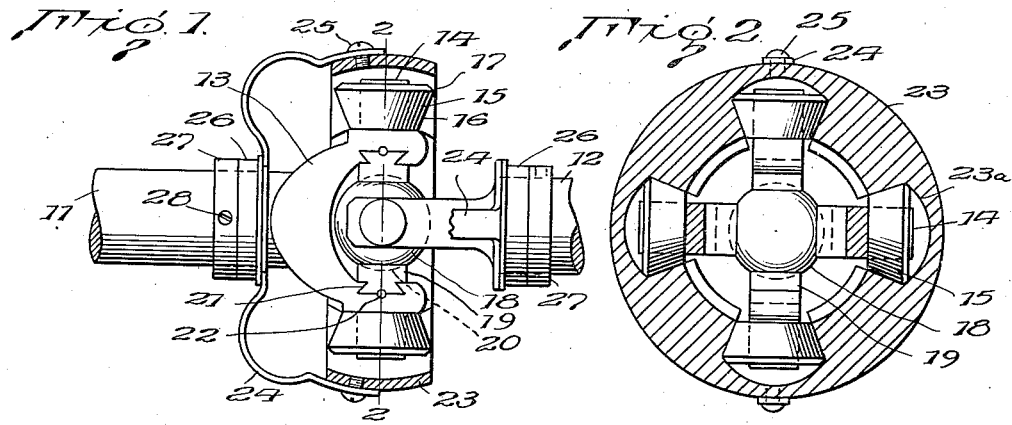
Inventor
Nikola Trbojevich Patented Oct. 17, 1939

2,176,111

UNITED STATES PATENT OFFICE 2,176,111

UNIVERSAL JOINT

Nikola Trbojevich, Detroit, Mich.

Application March 22, 1938, Serial No. 197,481

6 Claims. (Cl. 64—17)

The invention relates to universal joints of the type in which two T-shaped members engage an intermediate floating ring.

In particular, the joint is of the constant velocity type, but the principle of operation is somewhat different from the prevalent type in that the constant ratio of transmission is not accomplished by geometrical means alone, but also by a system of torque equalizing and balancing.

A curious result of this peculiarity is that the degree of constancy of velocities depends upon the relative masses of the three cooperating parts, inasmuch as there is no geometrical restraint which would prevent the mechanism from operating in an unlimited number of different ways.

I have constructed two joints to operate according to the new principle. The first one, hereinafter designated as the type "A", is built in and about a sphere and employs conical rollers. The second one, or the type "B" is built about a cylinder and contains spherical rollers.

The object of this invention is to construct a constant velocity joint.

Another object is to prevent the danger of jamming.

Still another object is to employ a heavier propeller shaft. In this construction a heavy shaft is beneficial as far as the uniformity of transmission is concerned.

In the drawing:

Fig. 1 shows the longitudinal section of the joint A, with the shafts aligned;

Fig. 2 is the cross section taken in the plane 2—2 of Fig. 1;

Fig. 3 shows the longitudinal section of the joint B, with the shafts aligned;

Fig. 4 is the cross section taken in the plane 4—4 of Fig. 3;

Figs. 5, 6, 7 and 8 are geometrical diagrams needed for the deduction of the mathematical formulas and equations used.

A. The spherical type

As shown in Figs. 1 and 2, the two drive shafts 11 and 12, respectively, are similar to each other, including their accessories. The yoke 13 and the roller journals 14 are integral with the shaft. The conical rollers 15 each having a torque carrying face 16 converging at the center of the sphere and an end thrust carrying face 17, are rotatably mounted upon the said trunnions 14, preferably by means of needle rollers. Both shafts 11 and 12 engage a centering ball 18 by means of two insertible spherical shoes 19 each having a spherical seat 20, a dovetail 21, and a fastening pin 22. When correctly assembled, the axes of both the shafts and the rollers should meet at the same point.

The ring 23 is a central zone of a sphere concentric with the shaft assembly and is provided with four meridional slots or grooves 23a, equispaced, diametrical, and in contour exactly corresponding to that of the rollers which it contains. In the position shown in Figs. 1 and 2, the two roller axes intersect each other at right angles and occupy the midplane of the ring member, but it is seen that each shaft can be moved independently of the other. Thus, I may hold the shaft 11 and the ring 23 together with my hand and move the remaining shaft 12 freely about in a cone just as if it were an ordinary universal joint.

The ring 23 is supported at each side by a cantilever form of spring 24, the ends of which are fastened by means of a screw 25 to the circumference of the ring 23, while its middle portion which is wide and is provided with a hole large enough to slip over the shaft 11 is welded to a rotatable bronze bushing 26. The tension of the spring may be regulated by means of the washer 27 and the set screw 28 which can be brought nearer to or farther from the center of the joint as desired.

The centering ball 18 together with the four concave shoes 19 in the center of the joint are not absolutely necessary for the correct operation of this joint, inasmuch as the taper rollers 15 moving in spherical slots are self-centering and will resist some end thrust. However, for practical purposes, it is deemed advisable to make sure that the taper rollers will not jam in their grooves when a considerable end thrust develops in either one of the shafts 11 or 12.

The springs 24 also can be omitted without making the joint inoperative. In this construction, the ring 23 while rotating together with the roller arms also nutates in a conical fashion similarly to a top, with twice the angular velocity of the shafting. In particular the center portion of the ring, its equator as it might be termed, is seeking or hunting the rollers at every instant. It is to be noted that the two springs 24 are mounted just back of their respective roller arms 14 and the corresponding spherical grooves 23a with the result that when the shaft 11, for instance, is rocked in the plane of paper up and down, the spring will be pushing the ring 23 approximately together with the rollers. The ring is also rotatable about the shaft 11 by means of the bushing 26 to allow for the angular discrepancy or lag in phase between the roller arm and the ring. The maximum discrepancy occurs at an angle of 45 degrees from the plane which the two shafts momentarily include and its exact values are 1° 44' for 20° shaft angle, 3° 51' for 30° shaft angle and 8° 25' for 45° shaft angle.

As has been previously stated, this joint in action is mathematically indeterminate and operates on the principle of balancing the torques. The mathematical part of this problem is interesting and may be briefly stated as follows: Three parts are cooperating, two sets of roller arms and a spherical ring. The torque arms of the rollers are of a constant magnitude, but their spacing is variable. In the ring member, just the opposite is true. The torque arms are variable (the arms being the radii of the latitude circles), while the angular spacing is constant (the grooves being meridional). It is evident now that the four rollers always must be in the same plane and form a quadrangle which is a rectangle, because it is inscribed in a circle and its two diagonals are of the same length. The mathematical procedure consists in first assuming that the two shafts are being rotated at a uniform velocity from which the sides of the roller rectangle are determined, as well as the direction cosines of the roller plane at every instant, i. e., determined as a function of the angular displacement of the two shafts. The momentary rectangle is then fitted into the sphere, representing the ring, in such a way that the two shorter sides of the roller rectangle are 90 degree chords of two latitudes antipodal with respect to each other and the longer sides are two chords of the connecting great circle. Now it is a curious and important fact that when the rectangle is thus fitted into the sphere, the four torque arms of the ring become all equal, thus proving the correctness of the first assumption.

This abstruse problem will be now carried only a little further by giving a few helpful mathematical formulas and hints in this connection. In Fig. 5, I have a rectangular coordinate system XYZ so selected that the X and Y axes are in the plane of the paper and bisect the shaft angle. In the initial position, the first roller P attached to the shaft 11 is at the origin, while the second roller Q attached to the shaft 12 is 90 degrees ahead of the roller P and lies for the moment in the plane of paper or the circumference of the unit circle 31. Thus, the path of the roller P is the great circle $OP_2P_1$, and the path of the roller Q is another great circle $OQ_2Q$ of the unit sphere 31, both inclined at the angle $a$ relative to the plane YZ. Note that the total shaft angle is $2a$.

The position of the ring axis in this initial position must be such as to present the same moment relative to both rollers P and Q. As far as the P roller is concerned, the ring axis may be anywhere in the plane of paper as long as it passes through the center of the sphere 31, but with respect to the Q roller the momentary axis must be perpendicular to the arm PQ. Hence, the axis of the ring coincides with the axis of the second shaft 12 at that instant. When the rollers P and Q are now each rotated forwardly in the direction of the arrows 29 and 30 respectively through a quadrant, the roller P will arrive in the position $P_1$, and the roller Q at O. The situation will now be reversed in comparison with the first described case and the momentary ring axis will now align itself with the first shaft 11.

It is seen now that the ring axis nutates in a cone 38 with twice the angular velocity of the shafts. When the roller is translated from P to $P_1$, an angle of 90 degrees, the ring axis is rotated from R to T probably through a curved path RST, an angular distance of 180 degrees which is twice the roller displacement.

Let now both shafts rotate through any angle $b$ as counted from the initial position, the roller rectangle assuming the corresponding position $P_2Q_2P_3Q_3$. The coordinates of the point P will be:

$$(p) \quad \begin{aligned} x_1 &= -\sin a \sin b \\ y_1 &= \cos a \sin b \\ z_1 &= \cos b \end{aligned} \quad (1)$$

and the coordinates of the point $Q_2$ will be:

$$(Q) \quad \begin{aligned} x_2 &= \sin a \cos b \\ y_2 &= \cos a \cos b \\ z_2 &= -\sin b \end{aligned} \quad (2)$$

The angle $c$ included between the roller arms $OP_2$ and $OQ_2$ can now be calculated by multiplying the corresponding coordinates (which being on the surface of a unit sphere are numerically equal to the direction cosines) and adding. After a proper simplification, I have $$\cos c = -\sin 2b \sin^2 a \quad (3)$$

The negative sign in the Equation 3 indicates that the angle $c$ is greater than 90 degrees from which it follows that the distance $P_2Q_2$ is the longer side of the roller quadrangle. An inspection of the right side of the Equation 3 indicates that a maximum value of $c$ is reached for $b=45$ degrees in which case $\sin 2b$ is equal to one. Denoting the maximum value of $c$ with $c_0$, I have $$\cos c_0 = -\sin^2 a \quad (4)$$

I can now determine the long and short sides of the roller rectangle, Fig. 6, without further data. Let the shorter side $P_2Q_3$ be denoted with $f$ and the longer side $P_2Q_2$ with the letter $g$. In the triangle $P_2OQ_2$ the two sides and the included angle are known. Thus, from Fig. 6

$$g = 2 \sin \frac{c}{2} \quad (5)$$

I shall now give the equation of the roller plane. This is obtained by substituting the coordinates in the Equations 1 and 2 into the well known determinant. Thus, I have $$x \cos a - y \sin a \cos 2b + z \sin a \cos a \sin 2b = 0 \quad (6)$$

This plane becomes the equator plane of the ring four times during each revolution, whenever $\sin 2b$ equals zero, i. e., when the values of $b$ are 0, 90, 180, etc. degrees and the coefficient of the $z$ coordinate vanishes. However for $b=45°$ 135°, etc., the coefficient of the $y$ coordinate vanishes and the Equation 6 reduces to this simple form:

$$-\frac{x}{z} = \sin a \quad (7)$$

The Equation 7 is useful from a practical standpoint in that it first enables one to determine the maximum out-swing of the roller plane relative to the equator plane of the ring, which, incidentally, is exactly equal to one half of the shaft angle, and second, the minor axis SU of the elliptic cone of nutation RSTU, Fig. 5, is now calculable. My calculation shows that the cone described by the axis of the ring 23 is comparatively flat. Any intermediate cone generator such as OS, corresponding to the quadrangle shown in dotted lines is also determinable.

B. The cylindrical type

The mathematical problem just discussed is capable of another solution in which the ring member has a constant spacing of the grooves and a constant torque arm while the roller unit has a variable spacing and variable torque arms. This principle leads to the mechanism shown in Figs. 3 and 4 in which the outer ring is of a cylindrical construction.

The shafts 11 and 12 are of the same form as in the former example and the difference lies only in the shape of the rollers and of the ring.

The rollers 32 are of the truncated spherical form and in addition to rolling are also longitudinally slidable upon the trunnions 14. The ring 33 is a comparatively short cylinder having four equispaced bores 34 of a diameter corresponding to that of the rollers 32. The spring suspension is now different from the one shown in Fig. 1, not because it has to be so, but merely to utilize the available space between the adjacent bores 34 in the ring. Four holes 35 are drilled in which the rubber rods 36 somewhat longer than the width of the ring 33 are inserted. Two rotatable bronze washer plates 37, one on each side, bear against the rubber rods 36 and are held in an adjustable position by means of the ring 27 and a set screw 28.

In Fig. 7 the nutation of the ring axis in a cone 38 is diagrammatically shown. The mathematical treatment is analogous with the one already described in all important details, except that the roller rectangle is now inscribed in an ellipse 39, Fig. 8, instead of in a circle, and the diagonals $P_2P_3$ and $Q_2Q_3$, although always mutually equal, vary in length from point to point and are the diameters of the ellipse 39 which degenerates into a circle four times during each revolution.

What I claim is:

1. A universal joint comprising a driving and a driven shaft, a cross shaft attached to each of the said shafts, four rollers, one at each end of the said cross shafts and a ring member having an axis and four equispaced grooves in its inner circumference longitudinally extending in two mutually perpendicular axial planes of the said ring and a cross contour corresponding to that of the rollers in which the axes of all the above said parts are assembled and held together to intersect in a point.

2. A universal joint comprising two intersecting rotary shafts, two cross shafts respectively perpendicular to the first shafts and intersecting each other at the same point, four rollers at the ends of the said shafts, a ring member having a body conforming to a surface of revolution and four equispaced meridional grooves in its inner circumference enclosing the said rollers, in which the ring member performs a conical nutation about an axis bisecting the shaft angle with twice the angular velocity of the said rotary shafts.

3. A universal joint comprising a driving and a driven shaft, two rollers on each shaft rotatable about an axis perpendicular to the shaft and passing through the point of intersection of the said two shafts, and a ring member having a body formed from a surface of revolution and having four equispaced meridional grooves in its inner circumference of a contour corresponding to that of the rollers and enclosing the said rollers.

4. In a universal joint the combinaion of two T-shaped members each consisting of a rotary shaft and a cross shaft connected thereto, a ring member having four meridional grooves arranged in two axial planes perpendicular to each other, said grooves being capable of engaging the corresponding extremities of the said cross shafts with means for swivelably connecting the two T members to each other at a common point at which the shaft and cross shaft axes all intersect each other.

5. A universal joint comprising a driving and a driven shaft, two conical rollers on each shaft rotatable about a cross axis perpendicular to the shaft axis and passing through the point of intersection of the said two shafts, and a spherical ring member having a body formed from a sphere of a radius equal to the distance of the rollers from the shaft axis and having four equispaced meridional grooves in its inner circumference of a contour corresponding to that of the rollers.

6. A universal joint comprising a driving and a driven shaft, two spherical rollers on each shaft rotatable about and longitudinally slidable on a cross axis perpendicular to the shaft axis, means for swivelably connecting the two shafts to intersect each other at a point at which the cross axes also intersect, a cylindrical ring member having four equispaced cylindrical grooves engaging the four rollers, and means for limiting the displacement of the ring member in the direction of its axis in either direction.

NIKOLA TRBOJEVICH.